Patented Dec. 19, 1944

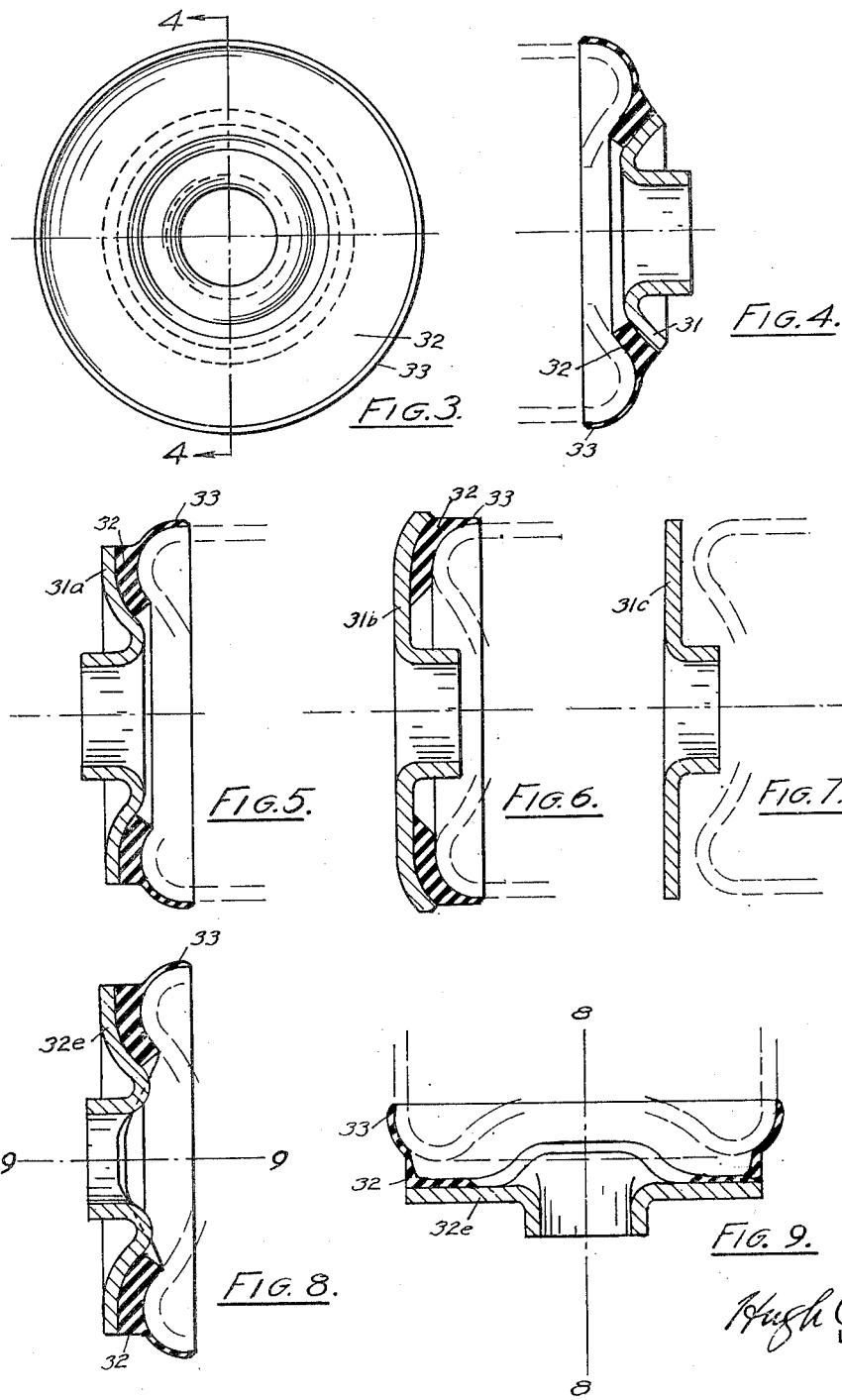

2,365,421

UNITED STATES PATENT OFFICE 2,365,421

RESILIENT MOUNTING

Hugh C. Lord, Erie, Pa., assignor to Lord Manufacturing Company, Erie, Pa., a corporation of Pennsylvania Application February 17, 1941, Serial No. 379,261

11 Claims. (Cl. 248—5)

This invention relates to resilient mountings, particularly those subjected to vibrations, and as illustrated the mountings are used on an apparatus having torque impulses as well as pitch and yaw impulses. The specific exemplification of the invention is in relation to an overhung radial engine on an airplane.

In many of these installations it is desirable to avoid some conditions to resist the maximum movement possible by the mounting while permitting a continued free vibration within the normal limits. The present invention is designed to accomplish this purpose. Features and details of the invention will appear from the specification and claims.

Preferred embodiments of the invention are illustrated in the accompanying drawings as follows.

Fig. 3 a plan view of a stop plate.

Fig. 4 a section on the line 4—4 in Fig. 3.

Figs. 5, 6 and 7 show sections of alternative constructions.

Fig. 8 shows a section of an alternative construction of a stop plate on the line 8—8 in Fig. 9.

Fig. 9 shows a section of an alternative construction of the stop plate on the line 9—9 in Fig. 8.

Figure 10:
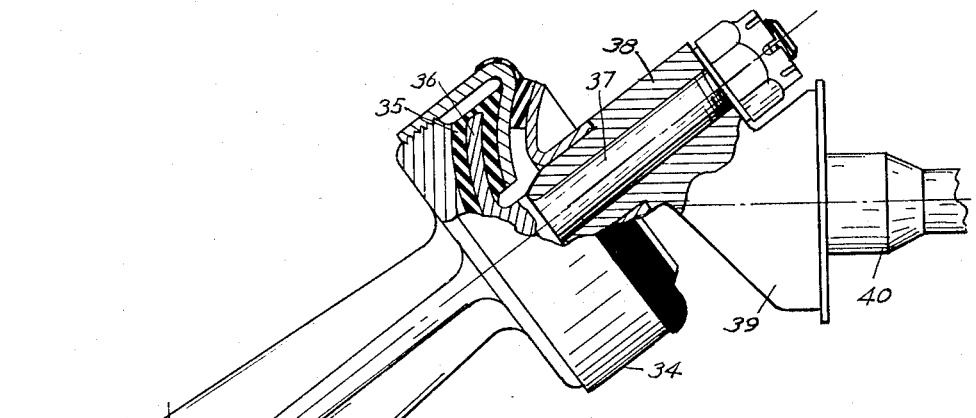

Fig. 10 shows a side elevation of an alternative construction of mounting with the invention in place thereon.

Figure 11:
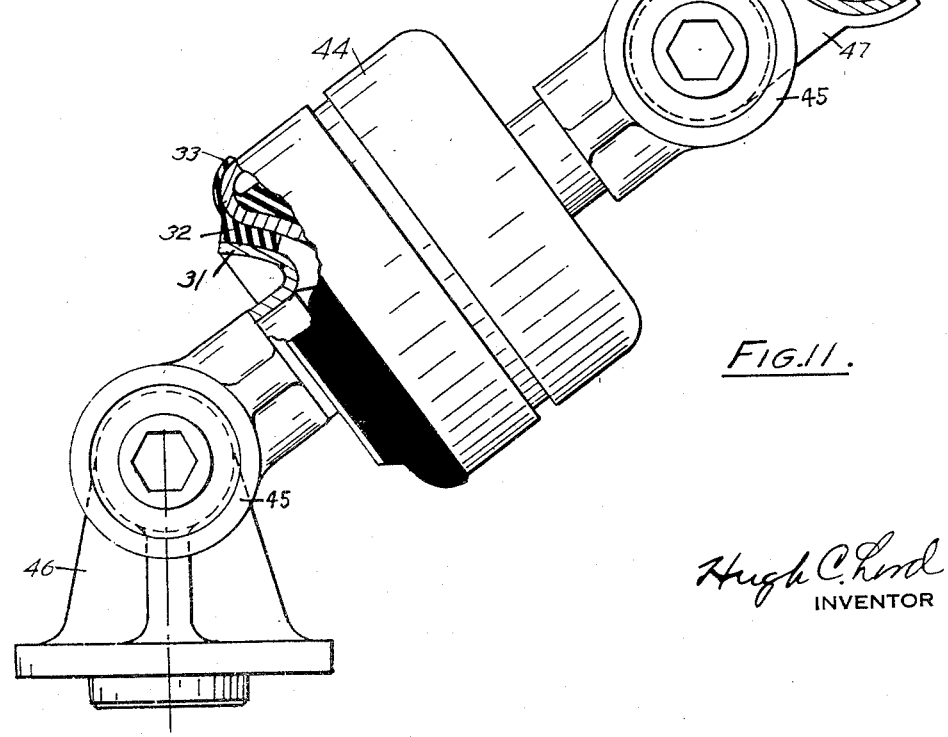

Fig. 11 shows a similar view of a further modification.

1 marks the supporting ring for the engine, 2 struts leading to the supporting ring, 3 an engine of the radial type having center of gravity approximately at 4.5 shows a propeller carried by the engine. The mounting 6 extends through the ring of the engine and is arranged to permit swinging around a focal point as 7 usually adjacent to but preferably in front of the center of gravity and also preferably on the axes of the engine.

The mounting includes a link which is shown as in the form of housings having walls 8 and the inwardly extending spherical ends 10. These housing sections are opposed to each other and of similar construction and are connected by a ring 9 which is screw-threaded to the opposing sections. Opposing spherical members 11 are arranged opposite the parts 10. These members 11 oppose the walls 10. These have the spherical portions 12 which are opposite the spherical portions 10 and side walls 13 which engage the ring 9. A core 14 is arranged between the spherical surfaces of the walls 10 and 12, and rubber elements 15 are arranged in the space between the core 14 and the walls 10 and 12, this having a general spherical shape and the rubber is preferably bonded to the opposing walls. The walls 8 and the edges of the core provide space for movement of the core relative to the link. Shanks 16 extend from the cores, and spaces 17 are provided through the walls 10 to permit the free movement of the shanks relatively to the link. At the engine end of the mounting the shank extends through a sleeve 18 and is secured therein by nut 19. The sleeve extends from a pedestal 20, the lower plate of which is secured by screws 21 to the engine. Preferably a centering projection 22 is provided for engaging the engine wall, thus definitely locating the pedestal. The shank at the ring end of the mounting extends through a sleeve 23 which extends from a fitting head 24. A shank 25 extends from the head 24 through arms 26 of a split bracket 27, the split bracket being secured on the ring. A nut 28 secures the shank 25 to the bracket.

Figure 1:
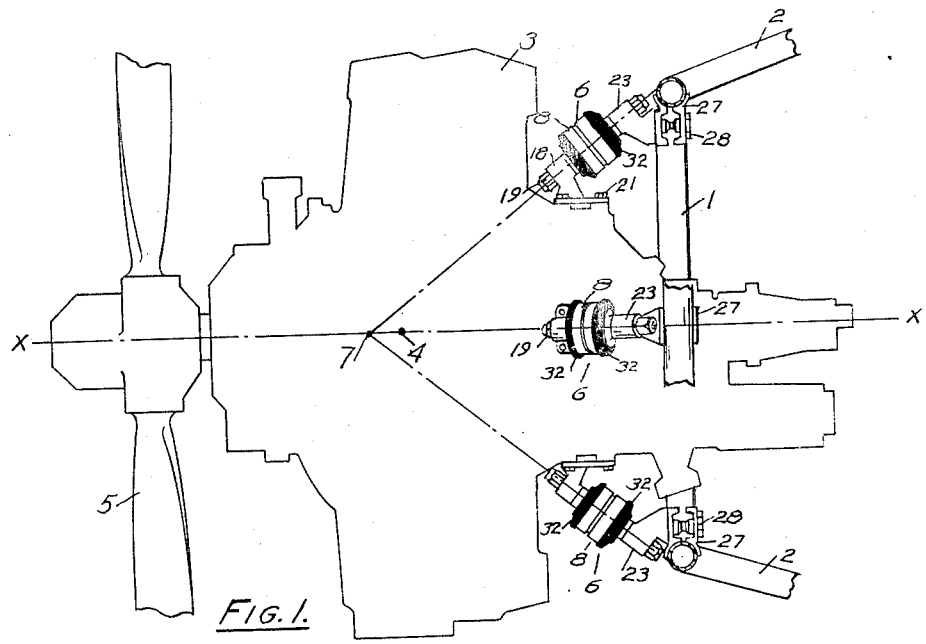
Fig. 1 shows a side elevation of an airplane engine and its method of mounting.
Figure 2:
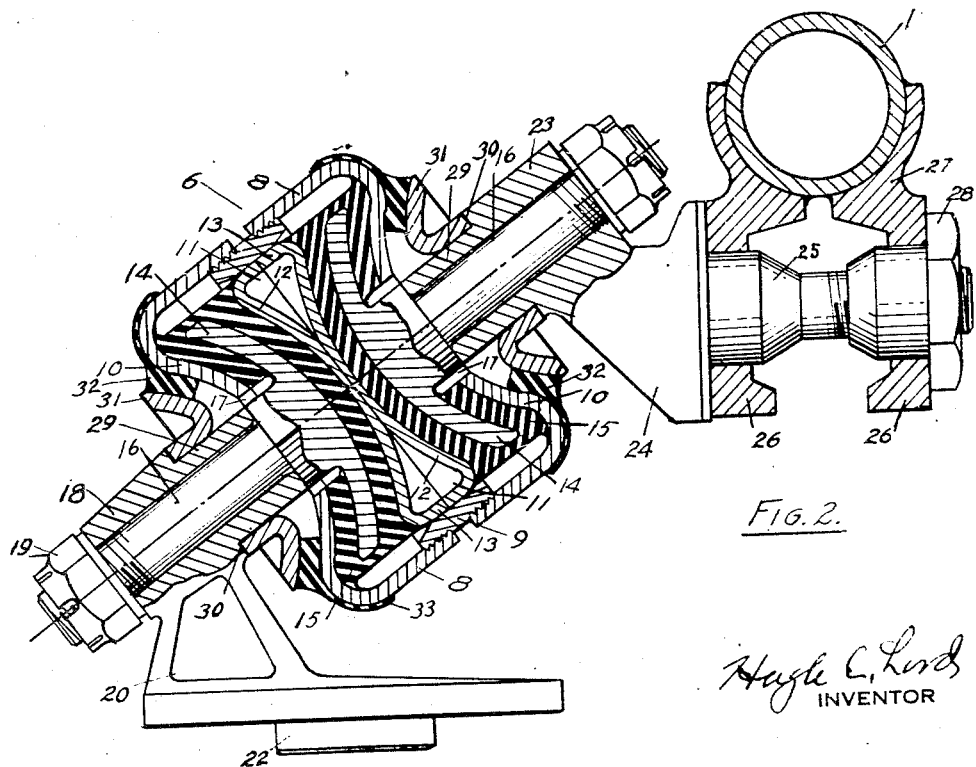
Fig. 2 shows a central section of a mounting unit.

It will be understood that there are a series of these mountings arranged around on the ring, each mounting having a focal point or axial point arranged at the focal point 7. It will be noted that as the engine is subjected to torque and pitch and yaw the spherical joints of the mounting permit of the torque movement and also of the pitch and yaw movement. In other words, they provide a universal movement in this respect about the focal point. In this respect the mounting corresponds in mode of operation and general outline with that described in my Patent No. 2,241,408, May 13, 1941. The present invention is designed to improve that and similar structures by providing them with a modifying means or stop which may be readily altered to change or limit the vibration movement. This is accomplished by providing an extension 29 on the sleeves 18 and 23. This provides a shoulder 30 in each instance. Plates 31 are forced on to this extension 29 and extend into position to be engaged by the ends of the link. The contacting surfaces of the plates are varied as shown in Figs. 2, 3 and 4. The plate is provided with a rubber face 32 which continuously engages the plate and preferably is slightly thicker at one side of the center over that of the other in the torque direction so that when the link is rocked through the torque impulse, the face of the rubber corresponds to the face of the link and so places the stop surfaces in neutral under normal torque conditions. In other words, preferably the stop mechanism does not become operatively effective under normal torque conditions, and this applies to each of the variations of stops.

As shown in Figs. 2, 3 and 4, the rubber extends somewhat in the direction tangent to the rocking movement of the link. Where this is the case the resistance to this movement, at least initially, is largely in shear with a modification of compression, thus varying the resistance at a different rate than that of the elements 15. Preferably the plate may be rounded with such ends as shown in Figs. 2, 3 and 4 to emphasize this manner of gradation in resistance. A lip 33 may be added which snaps over the outer walls 8 so as to seal the surfaces engaged by the link and the openings 17 leading to the mountings.

In the structure shown in Fig. 5 the plate 31a is flat but otherwise similar to plate 31 and the rubber extends more or less around the edge of the link so that the rubber face is more nearly engaged in compression than that shown in Fig. 2.

In Fig. 6 the plate 31b is slightly curved toward the link at its edges and the rubber element 32 between the plate and the link is very definitely involved in direct compression and thus the modification or stopping is more abrupt.

In Fig. 7 the plate 31c directly engages the link and forms a more definite stop. It will be noted that when the link is locked against swinging there is still some cushioning incident to the rubber elements 15. In effect the plates are locked with the cores but the core is free to move sidewise slightly so there is not a direct shock, but one plate may be used if desired because the locking of the link at one end locks both ends relatively to any swinging movement of the cores and consequently prevents the rocking shear movement of the cores in the link. Where it is used at one end even with the metallic contacting plate, there is a rubber insulation between the engine and the ring.

In some instances no contact will be desired in the normal running of the engine and in some instances it may be desired that the rubber face may not be effective in the normal running, as hereinbefore indicated, so that the effect may be limited only to an abnormal movement and to a more definite stop.

In Figs. 8 and 9 the plate 32e may be shaped like any of the preceding plates shown. The rubber element may have a section in one direction radially of the plate similar to those shown in any of the preceding views but this rubber element is not extended entirely around the plate and so becomes effective only in resisting movement in one direction. Thus if the rubber is extended in a direction radial to the axis of the engine and is not of sufficient thickness to be effective as to rocking movements in the torque direction it limits only the pitch and yaw and leaves the rocking incident to torque impulses substantially free from such resistance. On the other hand, if the long way of the strip is formed in the direction of the torque impulses, it is then made fully effective for varying or resisting the torque impulses but is still capable of modifying to some extent the pitch and yaw because all the mountings in the circle are not flexed in the same direction, the flexure on some of them being lengthwise of the rubber strip.

From this it will be seen that many variations may be made in the characteristics of the mountings by a mere variation of these plates and their faces with relation to the link.

In Fig. 10 I have shown a mounting having a housing 34, rubber elements 35, core 36, the core having a shank 37 secured in a fitting 38, the head 39 of the fitting having a shank extension 40 connected to the ring in the same manner as in Fig. 2. The housing is extended with a link 41 and terminates in a ball bearing 42 which ball bearing is carried by pedestal 43 secured to the engine in the same manner as the pedestal in Fig. 2. This structure corresponds closely to a structure shown as an alternative one in my Patent No. 2,241,408 above referred to. In this structure the plate 31 is secured on the fitting 38 in the same manner as plate 31 is secured on fitting 23 in Fig. 2 and engages the housing in a similar manner. It will be understood that the variations in plate surfaces may be shifted in accordance with the various modifications illustrated in the accompanying drawings with relation to the structure of Fig. 2.

In Fig. 11 a structure is shown corresponding to that disclosed in my former application #354,-595. In this structure the resilient portion of a mounting 44 is fastened to a resilient mounting shown in Fig. 2 and has corresponding shanks which extend into joint elements 45, these joint elements being confined to swinging around a single axis, one joint being secured to the pedestal 46 secured to the engine and the opposite joint being secured to a bracket 47 secured to the ring. In this structure the free swinging of the joint link in the pitch and yaw direction reduces the resistance to pitch and yaw movements in those directions to zero while maintaining the torque constant. A plate 31 similar to that of Fig. 2 is secured in the manner shown in Fig. 2 and operates on that mounting in the same manner except that the plates do not affect the free swinging of pitch and yaw in one direction. However, the plates may be modified in this direction to vary resistances or create definite stops in all or definite directions. The swinging of the links it will be understood vary the relative resistance between the torque and the pitch and yaw vibrations.

What I claim as new is:

1. A mounting comprising joint elements including spherically extending portions, a link extending from one of the joint elements, attaching devices supporting and supported by the mounting, one of the devices being connected with the link and the other device associated with the other element, and a stop means associated with the elements and providing for limited movement thereof, said stop means comprising opposing stop faces extending crosswise of a radius of the spherically extending portions.

2. A mounting having a plurality of converging connecting links, joint elements for each link including spherically extending portions, at least one of the joints for each link having resilient material between the spherically extending portions and accommodating through its distortion the movement of the joint, and a stop means associated with the elements of each joint and providing for limited movement thereof, said stop means comprising opposing stop faces extending crosswise of a radius of the spherically extending portions.

3. A mounting having a plurality of connecting links converging toward a focal point through which an axis around which the links are arranged extends, joint elements at each end of each link including spherically extending portions, at least one of the joints for each link having resilient material between the spherically extending portions and accommodating through its distortion the movement of the joint, and a stop means associated with elements of one of a joint of each link, said stop means providing for limited movement thereof comprising opposing stop faces extending crosswise of a radius of the spherically extending portions.

4. A mounting comprising joint elements including spherically extending portions, a link extending from one of the joint elements, attaching devices supporting and supported by the mounting, one of the devices being connected with the link and the other device associated with the other element, and a stop means associated with the elements and providing for limited movement thereof, said stop means comprising opposing stop faces extending crosswise of a radius of the spherically extending portions, one of the faces of each stop means being cushioned with resilient material.

5. A mounting comprising joint elements including spherically extending portions, a link extending from one of the joint elements, attaching devices supporting and supported by the mounting, one of the devices being connected with the link and the other device associated with the other element, and a stop means associated with the elements and providing for limited movement thereof, said stop means comprising opposing stop faces extending crosswise of a radius of the spherically extending portions, one of the faces of each stop means being cushioned with resilient material, a portion of the material being subjected to shear stress.

6. A mounting having a plurality of converging connecting links, joint elements for each link including spherically extending portions, at least one of the joints for each link having resilient material between the spherically extending portions and accommodating through its distortion the movement of the joint, and a stop means associated with the elements of each joint and providing for limited movement thereof, said stop means comprising opposing stop faces extending crosswise of a radius of the spherically extending portions, one of the faces of each stop means being cushioned with resilient material.

7. A mounting comprising joint elements including spherically extending portions, a link extending from one of the joint elements, attaching devices supporting and supported by the mounting, one of the devices being connected with the link and the other device associated with the other element, and a stop means associated with the elements and providing for limited movement thereof, said stop means comprising opposing stop faces extending crosswise of a radius of the spherically extending portions having resilient material between the faces, different portions of the resilient material exerting different pressures on the face to vary the action in different swinging directions.

8. A mounting comprising joint elements including spherically extending portions, a link extending from one of the joint elements, attaching devices supporting and supported by the mounting, one of the devices being connected with the link and the other device associated with the other element, and a stop means associated with the elements and providing for limited movement thereof, said stop means comprising opposing stop faces extending crosswise of a radius of the spherically extending portions, and subjected to shear and compression stresses, the relative resistance through shear and compression changing as the movement of the elements progresses to vary the characteristics of the resistance of the resilient material between the spherically extending portions.

9. A mounting having a plurality of converging connecting links, joint elements for each link including spherically extending portions, at least one of the joints for each link having resilient material between the spherically extending portions and accommodating through its distortion the movement of the joint, and a stop means associated with the elements of each joint and providing for limited movement thereof, said stop means comprising opposing stop faces extending crosswise of a radius of the spherically extending portions, one of the faces of each stop means being cushioned with resilient material, the contour of the face of the cushion being varied at different portions of the face to vary the cushion resistance in different directions.

10. A mounting assembly for a body subjected to rotational vibrations comprising a series of mounting units grouped around the axis of said body for supporting said body, each unit having joint elements comprising spherically extending portions, resilient material between the spherically extending portions and accommodating through its distortion the movement of the joint elements, a link extending from one of the joint elements of each unit, and stop means for each unit comprising opposing stop faces extending crosswise of a radius of the spherically extending portions and providing for limited movement thereof.

11. A mounting assembly for a body subjected to rotational vibrations comprising a series of mounting units grouped around the axis of said body for supporting said body, each unit having joint elements comprising spherically extending portions, resilient material between the spherically extending portions and accommodating through its distortion the movement of the joint elements, a link extending from one of the joint elements of each unit, and stop means for each unit comprising opposing stop faces extending crosswise of a radius of the spherically extending portions and providing for limited movement thereof, a stop face of the stop means of each unit being cushioned with resilient material.

HUGH C. LORD.